United States Patent [19]

Toda et al.

[11] Patent Number: 5,194,531
[45] Date of Patent: Mar. 16, 1993

[54] PROCESS FOR PRODUCING POLYOLEFINS

[75] Inventors: Masatoshi Toda; Hideo Funabashi; Ryo Aburatani; Akinobu Sugahara, all of Ichihara, Japan

[73] Assignee: Idemitsu Petrochemical Co., Ltd., Tokyo, Japan

[21] Appl. No.: 688,286

[22] Filed: Apr. 22, 1991

[30] Foreign Application Priority Data

Apr. 20, 1990 [JP] Japan .................. 2-102813

[51] Int. Cl.$^5$ .................. C08F 4/44
[52] U.S. Cl. .................. 526/125; 526/128; 526/351
[58] Field of Search .................. 526/125, 128

[56] References Cited

FOREIGN PATENT DOCUMENTS 0299712 1/1989 European Pat. Off.
0385765 9/1990 European Pat. Off.

Primary Examiner—Joseph L. Schofer
Assistant Examiner—David Wu
Attorney, Agent, or Firm—Antonelli, Terry, Stout & Kraus

[57] ABSTRACT

Disclosed is a process for producing a polyolefin which comprises contacting an olefin with a catalyst comprising:
(A) a solid catalyst component comprising, as essential components, (a) a magnesium compound, (b) halogenated titanium and (c) an electron donor compound;
(B) an organoaluminum compound; and
(C) an organosilicon compound selected from a group consisting of an organosilicon compound (C-1) having the general formula:

$$(R^1O)(R^2O)_{3-n}Si(OR^3)_n \qquad (I)$$

wherein $R^1$ is a branched hydrocarbon residue; $R^2$ and $R^3$ may be the same as or different from each other, and are linear or branched hydrocarbon residues, respectively; and n is from 2 to 3;
an organosilicon compound (C-2) having the general formula:

$$\begin{matrix} R^4 \diagdown \\ \phantom{R^4}\diagup Si(OR^5)_2 \\ R^4 \end{matrix} \qquad (II)$$

wherein $R^4$ is a hydrocarbon residue in which a carbon atom adjacent to Si is a tertiary carbon atom; and $R^5$ is a linear or branched hydrocarbon residue; and
an organosilicon compound (C-3) having the general formula:

$$R^6R^7Si(OR^8)_2 \qquad (III)$$

wherein $R^6$ is a branched hydrocarbon residue; $R^7$ is a cyclic saturated hydrocarbon residue; and $R^8$ is a linear or branched hydrocarbon residue.

6 Claims, 1 Drawing Sheet

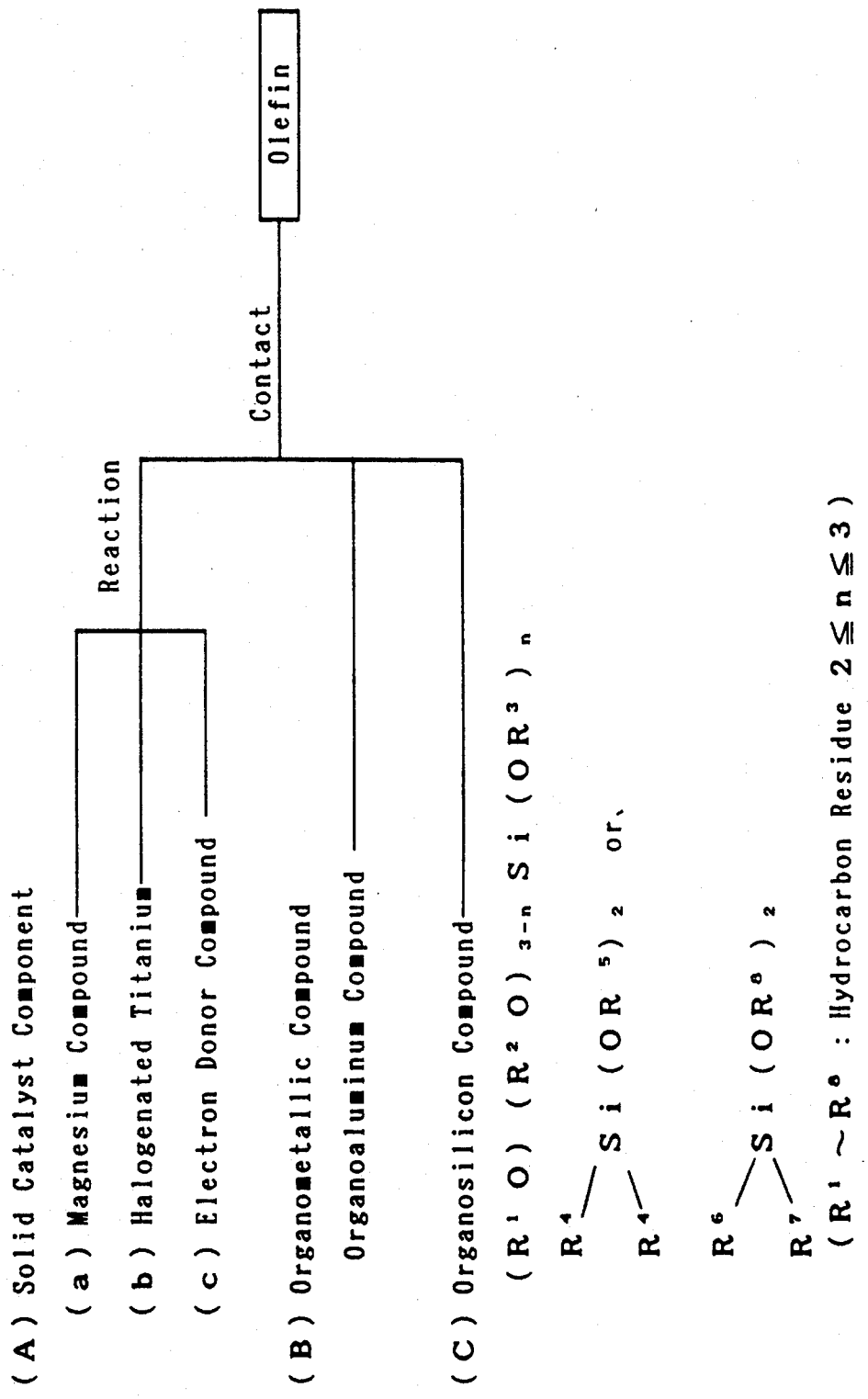

PROCESS FOR PRODUCING POLYOLEFINS

BACKGROUND OF INVENTION

1. Field of the Invention

The present invention relates to improvement of a process for producing polyolefins. More specifically, the present invention relates to a process for producing polyolefins having a high stereoregularity and/or having broad molecular weight distribution, in high yield.

2. Related Art

Heretofore, a production of polyolefins has been widely conducted by the use of a Ziegler-type catalyst. Several attempts to improve the Ziegler type catalysts have been made to obtain highly active catalysts or to obtain polyolefins having a high stereoregularity.

For example, JP Patent Appln. Laid-Open No.(-hereinafter referred to as Kokai) 57-63310 and Kokai 57-63311 disclose a process for polymerizing alpha-olefin having at least three carbon atoms, utilizing a catalyst which consists of a solid catalyst component comprising a magnesium compound, a titanium compound and electron donor compound; an organoaluminum compound; and an organosilicon compound having a Si—O—C linkage to improve stereoregularity. However, these processes are not always sufficient enough to obtain polymers having a high stereoregularity in high yield. Further improvement has been desired.

Kokai 54-94590 discloses, as a method of producing polymers with a high stereoregularity in high yield, a process for producing polyolefins, utilizing a solid catalyst component comprising a magnesium compound, a titanium compound and an electron donor compound; an organoaluminum compound; and an organosilicon compound having a Si—O—C— linkage. Kokai 62-11706 teaches a polymerization process using, as the organosilicon compound, a compound having a branched hydrocarbon residue. These processes can produce polymers with a high stereoregularity in high yield; however, the obtained polymers have narrow molecular weight distribution resulting in poor moldability. In the case of making large molded articles, it is difficult to obtain desired strength.

SUMMARY OF INVENTION

Accordingly, it is an object of the present invention to provide a process for producing polyolefins having a high stereoregularity in high yield, and a process for producing polyolefins having a high stereoregularity and broad molecular weight distribution in high yield.

The present inventors have made intensive studies to achieve the above object, and as a result, it was found that a polymer with a high stereoregularity can be produced in high yield by the use of a catalyst comprising a solid catalyst component comprising, as essential components, a magnesium compound, halogenated titanium and an electron donor compound; an organoaluminum compound; and tetraalkoxysilane having a specific structure. Also, it was found that a polymer with a high stereoregularity and broad molecular weight distribution can be produced in high yield by the use of a catalyst comprising said solid catalyst component; an organoaluminum compound; and dialkyldialkoxysilane having a specific structure. The present invention has been completed based on the above finding. There is now provided a process for producing a polyolefin which comprises contacting an olefin with a catalyst comprising:

(A) a solid catalyst component comprising, as essential components, (a) a magnesium compound, (b) halogenated titanium and (c) an electron donor compound;

(B) an organoaluminum compound; and (C) an organosilicon compound selected from a group consisting of an organosilicon compound (C-1) having the general formula:

$$(R^1O)(R^2O)_{3-n}Si(OR^3)_n \qquad (I)$$

wherein $R^1$ is a branched hydrocarbon residue; $R^2$ and $R^3$ may be the same as or different from each other, and are linear or branched hydrocarbon residues, respectively; and n is from 2 to 3;

an organosilicon compound (C-2) having the general formula:

$$\begin{array}{c} R^4 \\ \phantom{R^4}\diagdown \\ \phantom{R^4}\phantom{xx}Si(OR^5)_2 \\ \phantom{R^4}\diagup \\ R^4 \end{array} \qquad (II)$$

wherein $R^4$ is a hydrocarbon residue in which a carbon atom adjacent to Si is a tertiary carbon atom; and $R^5$ is a linear or branched hydrocarbon residue; and an organosilicon compound (C-3) having the general formula:

$$R^6R^7Si(OR^8)_2 \qquad (III)$$

wherein $R^6$ is a branched hydrocarbon residue; $R^7$ is a cyclic saturated hydrocarbon residue; and R8 is a linear or branched hydrocarbon residue.

BRIEF DESCRIPTION OF DRAWINGS

FIG. 1 is a flowchart showing one example of the embodiments according to the present invention.

DESCRIPTION OF THE INVENTION

The present invention will be described in more detail in the following description.

The solid catalyst component, Component (A), comprises, as essential components, a magnesium compound (a), halogenated titanium (b) and an electron donor compound (c).

The magnesium compound (a) includes, for example, metallic magnesium, alkylmagnesium halides prepared by reacting metallic magnesium with a halogenated hydrocarbon, dialkylmagnesium, halogenated magnesium, magnesium oxide, oxychloromagnesium, dialkoxymagnesium, alkoxymagnesium halide, organic acid magnesium, and magnesium compounds prepared by reacting the above compounds with a halogenating agent.

Further, in the present invention, a reaction product of metallic magnesium, alcohol and halogen can be preferably used as the magnesium compound used to prepare the solid catalyst. The use of such magnesium compound may result in better catalytic activity, higher stereoregularity and better titanium supporting capacity, and also may result in the resultant polymer powders with a better morphology.

In the present invention, the above-mentioned magnesium compound (a) has a sphericity (S) smaller than 1.60 as defined by Formula (1) below and a particle size distribution index (P) smaller than 5.0 as defined by Formula (2) below.

$$S = (E_1/E_2)^2 \quad (1)$$

wherein $E_1$ denotes the projected perimeter of a particle, and $E_2$ denotes the perimeter of the circle of equal projected area of a particle.

$$R = D_{90}/D_{10} \quad (2)$$

wherein $D_{90}$ denotes the particle diameter corresponding to a cumulative weight fraction of 90%, and $D_{10}$ denotes the particle diameter corresponding to a cumulative weight fraction of 10%. In Formula (2), the cumulative sum of the weight of particles smaller than the particle diameter defined by $D_{90}$ accounts for 90% of the total weight of all the particles. $D_{10}$ is defined in the same way.

In addition, the magnesium compound (a) should preferably be one which gives an X-ray diffraction spectrum (by Cu- kα line) in which three intense peaks appear within the scattering angle of 5°-20°, with the ratio of the peak intensity b/c being greater than 0.4, where peaks are designated as a, b, and c starting from the low scattering angle side.

In the present invention, metallic magnesium used to prepare the magnesium compound may be in any form, such as granule, ribbon, and powder. Also, the metallic magnesium should preferably be free of magnesium oxide film covering it, although no specific restrictions are placed on its surface state.

The alcohol is not specifically limited; but it should preferably be a lower alcohol having 1-6 carbon atoms. Ethanol is most desirable, because it gives a solid product, which greatly improves the catalyst performance. The alcohol may have any purity and water content which are not specifically limited. It is desirable, however, that the water content should be 1% or lower, preferably 2000 ppm or lower, because excess water in the alcohol forms magnesium hydroxide on the surface of metallic magnesium. Moreover, the water content should preferably be as low as possible, usually 200 ppm or lower, so that the resulting magnesium compound has a good morphology.

In the present invention, halogen used to prepare the magnesium compound include chlorine, bromine and iodine. The halogen may be used in any form and state. For example, it may be used in the form of solution in an alcohol.

The amount of the alcohol is not specifically limited; however, it usually ranges from 2 to 100 mol, preferably from 5 to 50 mol, per 1 mol of the metallic magnesium. An excess amount of alcohol is likely to give the magnesium compound having a good morphology. With too small an amount of alcohol, it is difficult to carry out smooth stirring in the reaction vessel. The above-mentioned molar ratio is not limitative.

The halogen should be used in an amount of at least 0.0001 gram-atom, preferably at least 0.0005 gram-atom, most preferably at least 0.001 gram-atom, per 1 mol of the metallic magnesium. With an amount less than 0.0001 gram-atom, without grinding, the magnesium compound (a) is poor in titanium-supporting capacity, catalytic activity, ability to form a polymer having a high stereoregularity, and a good morphology. In this case, grinding of the magnesium compound is required; however, this is an additional step and not preferable.

The amount of the halogen has no upper limit so long as the desired magnesium compound (a) is obtained. An adequate amount is usually less than 0.06 gram-atom. It is necessary to select an adequate amount of halogen in order to control the particle size of the resulting magnesium compound.

The reaction of metallic magnesium, alcohol, and halogen may be carried out by any known method, for example, which lasts for usually 20 to 30 hours until the reaction system does not evolve hydrogen gas any longer. More specifically, such known methods include:

(1) a method which comprises adding iodine in solid form to a mixture of alcohol and metallic magnesium, and reacting them under refluxing by heating;

(2) a method which comprises adding an alcohol solution of iodine dropwise to a mixture of alcohol and metallic magnesium, and reacting them under refluxing by heating; and (3) a method which comprises adding an alcohol solution of iodine dropwise to a mixture of alcohol and metallic magnesium while heating the mixture.

Regardless of the method selected, the reaction should preferably be carried out in an inert gas atmosphere such as nitrogen and argon and, if necessary, in the presence of an inert organic solvent such as saturated hydrocarbons such as n-hexane. It is not necessary to place the metallic magnesium, alcohol, and halogen all at once in the reaction vessel. It is possible to place them by portions in the reaction vessel. It is desirable to place all of the alcohol in the reaction vessel at the beginning and then to add metallic magnesium by portions several times. This procedure prevents the reaction system from evolving hydrogen gas in a large amount at one time and hence ensures safety and permits the use of a smaller reaction vessel, without the partial loss of alcohol and halogen by splashing. The number of portions should be properly determined according to the size of the reaction vessel; but it is usually 5 to 10 to avoid unnecessary complexity.

The reaction may be carried out batchwise or continuously. There is a modified method which comprises repeating the steps of adding a small portion of metallic magnesium to as much alcohol as necessary placed in a reaction vessel and removing the reaction product.

The thus obtained reaction product is used for the synthesis of a solid catalyst component (A) after drying or after filtration and washing with an inert solvent such as heptane.

The obtained magnesium compound (a) can be used as such without necessity for grinding or classification for a desired particle size distribution.

The magnesium compound (a) is almost spherical and has a sharp particle size distribution, with individual particles varying very little in sphericity. The magnesium compound should be composed of particles which have a sphericity (S) (as defined by Formula (1) above) of smaller than 1.60 and a particle size distribution index (P) (as defined by Formula (2) above of smaller than 5.0.

Other than the magnesium compounds prepared by reacting metallic magnesium, alcohol and at least 0.0001 gram-atom of halogen per 1 mol of the metallic magnesium, the solid product can exhibit good properties as carrier material, which has a sphericity (S) of smaller than 1.60 and a particle size distribution index (P) of smaller than 5.0.

The magnesium compound (a) can be used alone or in combination.

The halogenated titanium compound (b) which can be used in the present invention, may be selected from halogeneated compounds of trivalent or tetravalent titanium, especially titanium compounds represented by the following formula:

$$Ti(OR^9)X^1_m 4-m \quad (IV)$$

wherein $R^9$ is a hydrocarbon residue; X is a halogen atom; and m is an integer of 0 to 4. More specifically, $R^9$ may be a saturated or unsaturated hydrocarbon residue which can be linear, branched or cyclic, or those having a hetero atom such as sulfur, nitrogen, oxygen, silicon or phosphorus, preferably, a $C_{1-10}$ alkyl, alkenyl, cycloalkyl, cycloalkenyl, aryl or aralkyl group.

Examples of $R^9$ are a methyl group, ethyl group, n-propyl group, isopropyl group, n-butyl group, sec.-butyl group, isobutyl group, pentyl group, hexyl group, heptyl group, octyl group, decyl group, allyl group, butenyl group, cyclopentyl group, cyclohexyl group, cyclohexenyl group, phenyl group, tolyl group, benzyl group, phenetyl group and the like. $X^1$ of Formula (IV) include a halogen atom such as a fluorine atom, chlorine atom, bromine atom or iodine atom. Of these, a chlorine atom and a bromine atom are preferable with a chlorine atom being most preferable.

Typical examples of the halogenated titanium as represented by Formula (IV), include titanium tetrachloride (m=0), titanium tetrabromide (m=0), ethoxytitanium trichloride (m=1), n-propoxytitanium trichloride (m=1), n-butoxytitanium trichloride (m=1), diethoxytitanium dichloride (m=2), di-n-propoxytitanium dichloride (m=2), di-n-butoxytitanium dichloride (m=2), triethoxytitanium monochloride (m=3), tri-n-propoxytitanium monochloride (m=3), tri-n-butoxytitanium monochloride (m=3). These halogenated titanium compounds may be used alone or in combination.

In the present invention, the electron donor compounds (c) include amines, amides, ketones, nitriles, phosphines, phosphoramides, esters, etheres, thioethers, thioesters, acid anhydrides, acid halides, acid amides, aldehydes, organic acids, and organosilane compounds containing a Si—O—C linkage.

More specifically, examples of the electron donor compounds are aromatic carboxylic acids such as benzoic acid and p-oxybenoic acid;

acid anhydrides such as succinic anhydride, benzoic anhydride and p-toluic anhydride;

ketones having 3-15 carbon atoms such as acetone, methyl ethyl ketone, methyl isobutyl ketone, acetophenone, benzophenone and benzoquinone;

aldehydes having 2-15 carbon atoms such as acetaldehyde, propionaldehyde, octyl aldehyde, benzaldehyde, tolualdehyde and naphthaldehyde;

esters having 2-18 carbon atoms such as methyl formate, methyl acetate, ethyl acetate, vinyl acetate, propyl acetate, octyl acetate, cyclohexyl acetate, ethyl propionate, ethyl butyrate, ethyl valerate, methyl chloroacetate, ethyl dichloroacetate, methyl methoacrylate, ethyl crotonate, ethyl pivalate, dimethyl maleate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, ethyl p-butoxybenzoate, ethyl o-chlorobenzoate, ethyl naphthoate, gamma-butyrolactone, -valerolactone, coumarin, phthalide, ethylene carbonate, di-n-butyl phthalate, diisobutyl phthalate, diheptyl phthalate and dicyclohexyl phthalate;

acid halides having 2-15 carbon atoms such as acetyl chloride, benzyl chloride, toluic acid chloride and anisic acid chloride;

ethers having 2-20 carbon atoms such as methyl ether, ethyl ether, isopropyl ether, ter.-butyl methyl ether, ter.-butyl ethyl ether, n-butyl ether, amyl ether, tetrahydrofuran, anisole, diphenyl ether, ethylene glycol butyl ether;

acid amides such as acetic acid amide, benzoic acid amide and toluic acid amide;

amines such as tributyl amine, N,N'-dimethylpiperazine, tribenzylamine, aniline, pyridine, pycoline, tetramethyl ethylene diamine;

nitriles such as acetonitrile, benzonitrile, tolunitrile; tetramethyl urea; nitro benzene; lithium butyrate; and the like.

Preferred electron donor compounds (c) include mono- and di-esters of aromatic dicarboxylic acids, especially mono- and and di-esters of phthalic acid. Examples of mono- and di-esters of aromatic dicarboxylic acids are dimethyl phthalate, monoethyl terephthalate, dimethyl terephthalate, monoethyl phthalate, diethyl phthalate, monoethyl terephthalate, diethyl terephthalate, monopropyl phthalate, dipropyl phthalate, monopropyl terephthalate, dipropyl terephthalate, monobutyl phthalate, dibutyl phthalate, monobutyl terephthalate, dibutyl terephthalate, monoisobutyl phthalate, diisobutyl phthalate, monoamyl phthalate, diamyl phthalate, monoisoamyl phthalate, diisoamyl phthalate, ethyl butyl phthalate, ethyl isobutyl phthalate and ethyl propyl phthalate.

Diesters of aromatic dicarboxylic acids are more preferable than monoesters thereof. Of these diesters of aromatic dicarboxylic acids, lower $C_{1-5}$ alkyl esters of phthalic acids are preferred with dibutyl phthalate and diisobutyl phthalate being especially preferred.

These esters may be used alone or in combination with one another.

In the present invention, a silicon compound, Component (d), represented by Formula (V) below can be used to prepare the solid catalyst component (A) in addition to Components (a), (b) and (c).

$$Si(OR^{10})_q X^2 4-q \quad (V)$$

wherein $R^{10}$ is a hydrocarbon residue; $X^2$ is a halogen atom; and q is an integer of 1 to 3. More specifically, $R^{10}$ may be a saturated or unsaturated hydrocarbon residue which can be linear, branched or cyclic, or those having a hetero atom such as sulfur, nitrogen, oxygen, silicon or phosphorus, preferably, a $C_{1-10}$ alkyl, alkenyl, cycloalkyl, cycloalkenyl, aryl or aralkyl group. $R^{10}$ may be the same as or different from each other if there are two or more groups as designated by $R^{10}$. $R^{10}$ may be selected from the examples listed for $R^9$ of Formula (IV) as above. $X^2$ in Formula (V) is a halogen atom such as a fluorine atom, chlorine atom, bromine atom or iodine atom. Of these, a chlorine atom and bromine atom are preferable with a chlorine atom being most preferable.

Examples of the silicon compounds are, for example, $SiCl_4$, $CH_3OSiCl_3$, $(CH_3O)_2SiCl_2$, $(CH_3O)SiCl$, $C_2H_5OSiCl_3$, $(C_2H_5O)_2SiCl_2$, $(C_2H_5O)_3SiCl$, $C_5H_7OSiCl_3$, $(C_3H_7O)_2SiCl_2$ and $(C_3H_7O)_3SiCl$. Of these, silicon tetrachloride ($SiCl_4$) is particularly preferred. These silicon compounds may be used alone or in combination.

The silicon compound, Component (d) which can be used when desired, may be used in amount to provide a silicon compound to magnesium compound molar ratio of preferably 0.01 to 0.30, more preferably 0.01 to 0.20. With the molar ratio of less than 0.01, a catalytic activity and stereoregularity cannot be sufficiently improved and the amount of microparticles in the resultant polymer powders will increase. With the molar ratio of more than 0.30, the amount of large particles in the resultant polymer powder will increase. Thus, the use of the molar ratio outside above range is not preferable.

The above solid catalyst component (A) can be prepared by any known processes as described in, for example, Kokai 53-43094; 55-135102; 55-135103; and 56-18606. The known processes include:

(1) a process comprising grinding a magnesium compound or a complex of a magnesium compound and an electron donor compound in the presence of an electron donor compound and, if desired, a grinding promoter, and then reacting the ground mixture with halogenated titanium;

(2) a process comprising reacting a magnesium compound in the form of liquid, having no reduction capability, with liquid halogenated titanium in the presence of an electron donor compound to precipitate a titanium complex in a solid form;

(3) a process comprising further reacting the resultant product of Process (1) or (2) with halogenated titanium;

(4) a process comprising further reacting the resultant product of Process (1) or (2) with an electron donor compound and halogenated titanium;

(5) a process comprising grinding a magnesium compound or a complex of a magnesium compound and an electron donor compound in the presence of an electron donor compound, a titanium compound and, as desired, a grinding promoter, and then treating the ground mixture with halogen or a halogen compound.

Further, the solid catalyst component (A) can be prepared by process other than those mentioned above, for example, those described in Kokai 56-166205; 57-63309; 57-190004; 57-300407; and 58-47003.

In addition, the solid catalyst component (A) can be prepared by a process which comprises contacting an oxide of elements belonging to the II to IV Groups of the Periodic Table (such as silicon oxide, magnesium oxide and aluminum oxide), or oxide complex containing at least one oxide of elements belonging to the II to IV Groups of the Periodic Table (such as a solid product wherein the above magnesium compound is carried on silica-alumina), with an electron donor compound and halogenated titanium in a solvent at 0° to 200° C., preferably 10° to 150° C. for 2 minutes to 24 hours.

The preparation of the solid catalyst component can be carried out in a solvent inert to the magnesium compound, the electron donor compound and the halogenated titanium. Such inert solvents include aliphatic hydrocarbons such as hexane and heptane; aromatic hydrocarbons such as benzene and toluene; halogenated hydrocarbons such as mono- and polyhalogen compounds of fatty, cyclic or aromatic hydrocarbons having 1–12 carbon atoms.

The organoaluminum compounds which can be used in the present invention are represented by the following formula:

$$AlR^{11}{}_pX^3{}_{3-p} \tag{VI}$$

wherein $R^{11}$ is an alkyl group having 1–10 carbon atoms; and $X^3$ is a halogen atom such as chlorine or bromine; and p is an integer of 1 to 3.

Examples of the organoaluminum compound include trialkylaluminum such as trimethylaluminum, triethylaluminum, triisopropylaluminum, triisobutylaluminum and trioctylaluminum; and dialkylaluminum monohalide such as diethylaluminum monochloride, diisopropylaluminum monochloride, diisobutyl-aluminum monochloride and dioctylaluminum monochloride; and alkylaluminum sesquihalide such as ethylaluminum sesquichloride. These organoaluminum compounds may me used alone or in combination.

In the present invention, Catalyst component (C) is selected from the organosilicon compounds represented by Formulas (I), (II) and (III) below.

Formula (I)

$$(R^1O)(R^2O)_{3-n}Si(OR^3)_n \tag{I}$$

wherein $R^1$ is a branched hydrocarbon residue; $R^2$ and $R^3$ may be the same as or different from each other, and are linear or branched hydrocarbon residues, respectively; and n is from 2 to 3.

Formula (II)

$$\begin{array}{c} R^4 \\ \phantom{R^4}\diagdown \\ \phantom{R^4R^4}Si(OR^5)_2 \\ \phantom{R^4}\diagup \\ R^4 \end{array} \tag{II}$$

wherein $R^4$ is a hydrocarbon residue in which a carbon atom adjacent to Si is a tertiary carbon atom; and $R^5$ is a linear or branched hydrocarbon residue.

Formula (III)

$$R^6R^7Si(OR^8)_2 \tag{III}$$

wherein $R^6$ is a branched hydrocarbon residue; $R^7$ is a cyclic saturated hydrocarbon residue; and $R^8$ is a linear or branched hydrocarbon residue.

In the above Formula (I), $R^1$ is a branched hydrocarbon residue. The branched hydrocarbon residues include an alkyl group, cycloalkyl group and aryl groups such as a phenyl group and methyl-substituted phenyl group. $R^1$ is preferably a group in which the carbon atom adjacent to the silicon atom is a secondary or tertiary one, particularly a group in which the specific carbon atom has three alkyl groups. Moreover, $R^1$ preferably has 3–20 carbon atoms, more preferably 4–10 carbon atoms.

$R^2$ in the above Formula (I) may preferably be a branched or linear aliphatic hydrocarbon group having 1–20 carbon atoms, more preferably 1–10 carbon atoms. $R^3$ in the Formula (I) may preferably be an aliphatic hydrocarbon group, more preferably a branched aliphatic hydrocarbon group having 1–4 carbon atoms.

Examples of the organosilicon compounds are tetraalkoxysilane compounds represented by the following formulas.

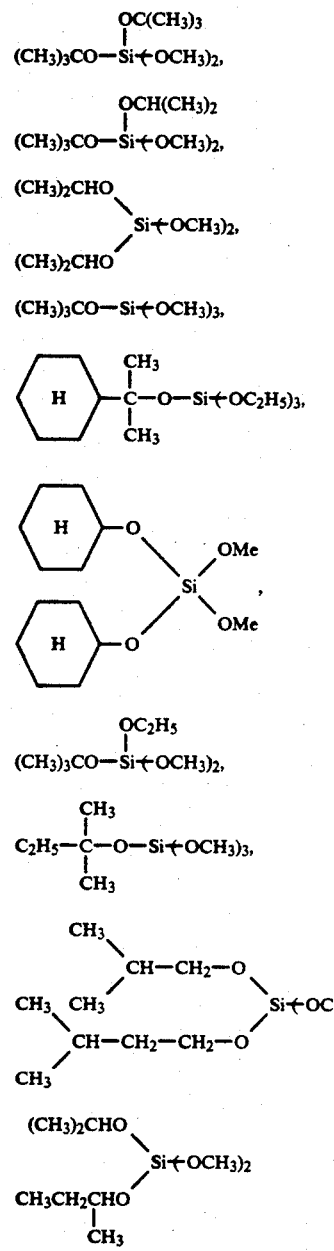

These tetraalkoxysilanes may be used alone or in combination.

In addition, Kokai 57-63310 and 57-63311 disclose tetramethoxysilane as tetraalkoxysilane. However, it is quite difficult to obtain a polymer with a high stereoregularity in high yield by the use of tetramethoxysilane. Such desirable polymer can be produced by the use of the tetraalkoxysilane having the above structure.

In the Formula (II), $R^4$ may be a hydrocarbon residue in which the carbon atom adjacent to the silicon atom is a tertiary carbon atom.

In Formula (II), $R^5$ is a linear or branched hydrocarbon residue, preferably an aliphatic hydrocarbon residue, more preferably a branched aliphatic hydrocarbon residue having 1–4 carbon atoms.

For example, these organosilicon compounds are represented by the following formulas.

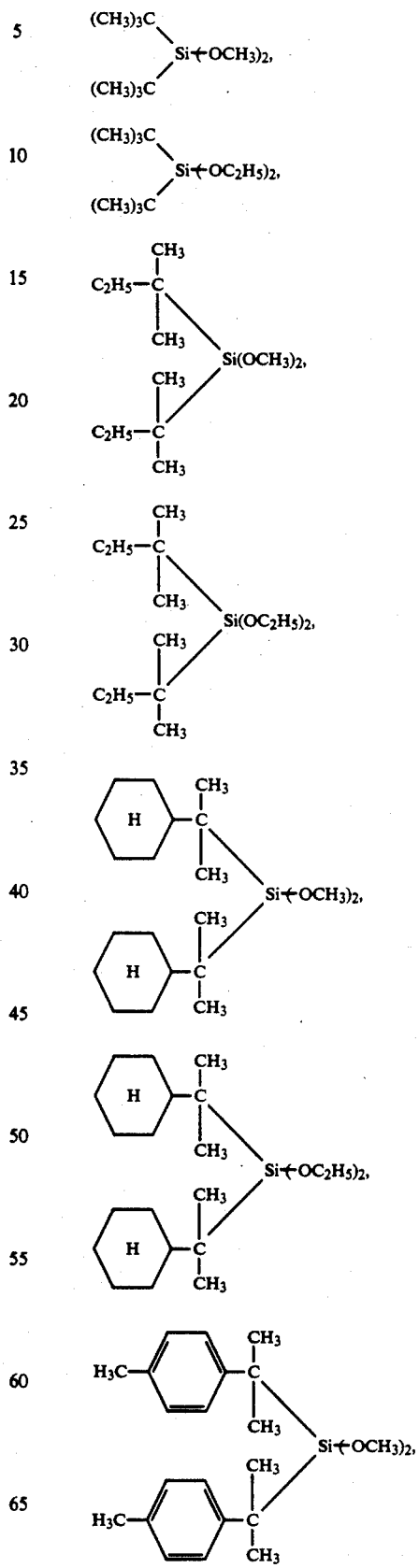

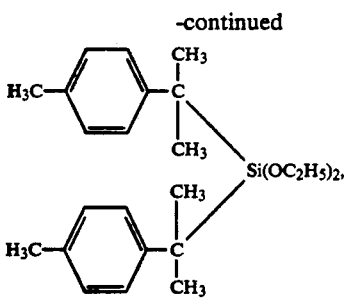

These dialkyldialkoxysilanes may be used alone or in combination.

The compounds represented by Formula (III) include, for example, isopropylcyclohexyldimethoxysilane, isobutylcyclohexyldimethoxysilane, t-butylcyclohexyldimethoxysilane, isopropylcyclohexyldiethoxysilane, isobutylcyclohexyldiethoxysilane, t-butylcyclohexyldiethoxysilane.

The use of the above dialkyldialkoxysilane results in a production of a polymer having a high steroregularity and broad molecular weight distribution with high yield.

In the present invention, each component of the catalyst is used in the following amounts. The solid catalyst component (A) may be used in an amount of from 0.0005 to 1 mmol per 1 liter of a reaction volume, in terms of titanium atom. The organoaluminum compound, Component (B), may preferably be used in an amount to provide an Al/Ti atomic ratio of 1 to 1000, more preferably from 5 to 500. The use of the ranges outside of the atomic ratio will result in poor catalytic activity. The organosilicon compound, Component (C), may preferably be used in an amount to provide an organosilicon/titanium molar ratio of 0.1 to 500, more preferably 1 to 100. The use of the molar ratio less than 0.1 will result in poor durability of the catalytic activity and the resulting polymers with low stereoregularity. The molar ratio more than 500 may result in poor catalytic activity.

In the practice of the present invention, an olefin homopolymer or olefin copolymer can be produced by polymerizing at least one olefin monomer in the presence of a catalyst comprising the solid catalyst component (A), the organoaluminum compound (B) and the organosilicon compound (C).

The olefins which can be produced by the process of the present invention are represented by the following formula:

R$^{12}$—CH=CH$_2$ wherein R$^{12}$ is a hydrogen atom or a linear or branched C$_{1-10}$ hydrocarbon group.

Examples of the olefins include straight-chain monoolefins such as ethylene, propylene, butene-1, pentene-1, hexene-1, octene-1 and decene-1; branched-chain monoolefins such as 4-methyl-pentene-1; and vinyl cyclohexane. These olefins may be used alone or in combination.

According to the present invention, the polymerization is not particularly limited, and can be carried out by any known methods. For example, the polymerization can be carried out by a slurry polymerization method using an inert hydrocarbon solvent. The polymerization can be carried out batchwise or continuously, and also can be carried out in one step or in several steps.

In the case of the multi-step polymerization such as a two step polymerization, in the first step crystalline polypropylene is usually produced by the polymerization of propylene in the presence of the catalyst components (A), (B) and (C), and in the second step ethylene and propylene is subjected to copolymerization with or without removal of unreacted propylene supplied in the first step, in the presence of the crystalline polypropylene and a catalyst.

The reaction conditions in the present invention are not specifically limited; however, the olefin pressure may usually range from normal pressure to 50 Kg/cm$^2$ G, and the reaction temperature may usually range from 0° to 200° C., more preferably 50° to 100° C. The molecular weight of the resultant polymer can be controlled by any known methods, for example, a method of controlling hydrogen concentration in a reactor. The reaction time may vary depending upon kinds of olefins, reaction temperature and the like, and cannot be readily specified. Usually the reaction time may range from 1 minute to 10 hours, preferably from 30 minutes to 5 hours. With respect to the catalyst components, immediately after catalyst components (A), (B) and (C) are mixed at a prescribed ratio and contacted with each other, an olefin is introduced and the polymerization is initiated. To age the catalyst components, it is possible to introduce olefin into a reactor, 0.2 to 3 hours after such contact of catalyst components. Further, it is also possible to add olefin during such aging period to prepare less than 0.1 g of initial olefin polymer (polymer obtained at the beginning of polymerization) per 1 g of Component (A). Then, the reaction mixture may be supplied to a substantial polymerization step. The preparation of the initial polymer may result in further improvement of morphology of the resultant polymer. The use of excess amount of initial polymer may cause fish eyes in the resultant molded articles. Thus, it is preferable to prepare less than 0.1 g of such initial polymer. Further, these catalyst components can be supplied in the form of suspension in an inert solvent or olefin.

In the present invention, post treatment after polymerization can be conducted by any known methods. In the case of a gas phase polymerization, the resultant polymer powders supplied from a polymerization reactor may be treated with nitrogen stream to remove olefins contained in the polymer powders. If desired, the resultant polymer powders may be pelletized. During the pelletization, a small amount of water, alcohol or the like may be added to the powders in order to completely inactivate the catalyst. Further, in the case of bulk polymerization, after polymerization, remaining monomers may be removed completely from the resultant polymer and then the polymer may be pelletized.

FIG. 1 is a flowchart showing one example of embodiments of the present invention.

According to the present invention, the polymerization of olefins using a catalyst comprising a solid catalyst component comprising, as essential components, a magnesium compound, halogenated titanium and an electron donor compound, an organoaluminum compound and a tetraalkoxysilane having a specific structure, gives rise to an olefin polymer having a high stereoregularity with high yield.

Further, if dialkyldialkoxysilane having a specific structure is used instead of the above tetralkoxysilane, an olefin polymer having a high stereoregularity, broad molecular weight distribution and good moldability, can be produced in high yield.

The present invention will be described in more detail with reference to the following examples, which are not intended to restrict the scope of the invention.

EXAMPLES AND COMPARATIVE EXAMPLES (1) The molecular weight distribution, Mw/Mn was measured in accordance with the following method. By the use of standard polystyrene whose molecular weight was known (unidispersed polystyrene; produced by Toyo Soda), a count for GPC corresponding to molecular weight, M of the polystyrene, was measured. Then, correction curve for molecular weight and elution volume (EV) was prepared.

(2) The Gel Permeation Chlomatogram for a sample to be measured was measured by GPC. By the use of the correction curve, number average molecular weight:

$$Mn = \frac{\Sigma M_i N_i}{\Sigma N_i}$$

and weight average molecular weight:

$$Mw = \frac{\Sigma M_i^2 N_i}{\Sigma M_i N_i}$$

were calculated to determine a value of Mw/Mn.

A preparation method of samples and measurement conditions for GPC were described below.

SAMPLE PREPARATION (a) A polymer and o-dichlorobenzene as solvent were introduced into Eilen-Meiyer flask to prepare a polymer solution having a concentration of 15 mg-polymer/20 ml-solvent.

(b) To the polymer solution, 0.1 weight % of 2,6-di-t-butyl-p-cresol was added as stabilizer.

(c) The polymer solution was kept at 140° C. for 1 hour, stirred for one hour to allow the polymer and stabilizer to be completely dissolved.

(d) The polymer solution was filtered with a 0 5 micron filter at 135° to 140° C.

(e) The filtrate was measured by GPC.

MEASUREMENT CONDITIONS FOR GPC (a) Device: Modell 150C (Manufactured by Water Co.)
(b) Colomn: TSKGMH-6.6 mm $\phi \times 600$ mm (Manufactured by Toyo Soda)
(c) Sample Amount: 400 microliter
(d) Temperature: 135° C.
(e) Flow Rate: 1 ml/min.

In the following examples, the following reagents were used.
Ethanol: Reagent Grade (Made by Wako Junyaku Co.)
Iodine: Reagent Grade (Made by Wako Junyaku Co.)
Metallic Magnesium: Granular Form (350 micrometers in average particle size.)

Measurements of X-ray diffraction were carried out in the following manner.

The magnesium compound was ground into powders having an average particle size of 10 micron, which was subsequently vacuum-dried at normal temperature. The dry powder was filled in a cell of Mylar film under an inert gas atmosphere. The Mylar film is 6 micron thick and the cell is 1 mm thick (including the thicknesses of the Mylar film and dry powder). The cell was attached to the powder X-ray diffraction apparatus (made by Rigaku Denki Kogyo Co.) for measurement of X-ray diffraction spectrum by the transmission method. X-rays having a wavelength ($2k\alpha$) of 1.543 A were generated by using a copper anticathode at a voltage of 50 kV and a current of 120 mA.

The sphericity (S) was measured in the following manner.

A dry sample of the magnesium compound (a) was photographed with a magnification of x 150 using a scanning electron microscope (Model JSM-25S III, made by Nippon Denshi Co.) at an accelerating voltage of 5 kV. The resulting negative underwent image processing by the transmission method using an image processing apparatus (made by Nexus Co.). Particles smaller than 20 pixels (each pixel measuring 1.389 micrometer square) were disregarded, and the remaining particles (about 2000 pieces) were examined. The sphericity was calculated according to Formula (1) above from $E_1$ (the projected perimeter of a particle) and $E_2$ (the perimeter of the circle of equal projected area of a particle).

The particle size distribution index (P) was calculated as follows. The particle size distribution was measured by sieving. The 90% particle diameter ($D_{90}$) and 10% particle diameter ($D_{10}$) were obtained from the particle size distribution plotted on a logarithmic distribution paper. Then, the particle size distribution index (P) was calculated according to Formula (2) above.

These procedures were used in the following examples and comparative examples.

EXAMPLE 1

(1) Preparation of Solid Catalyst Component (A)

In a 500-ml four-mouth flask, were placed 60 ml of purified heptane, 16 g of diethoxymagnesium, and 2.3 ml of diethyl phthalate. The mixture was stirred at room temperature, and then 2.4 ml of silicon tetrachloride was added to the mixture. The temperature was raised and the mixture was reacted for 30 minutes under refluxing conditions. Then, 77 ml of titanium tetrachloride was further added. After the reaction was carried out at 110° C. for 2 hours, the reaction product was washed with n-heptane. Then, 122 ml of titanium tetrachloride was further added and reaction was further carried out for 2 hours. The reaction product was again purified with n-heptane to obtain a solid catalyst component (A).

(2) Olefin Polymerization

In a 1-liter stainless steel autoclave, were placed 400 ml of n-heptane, 2.0 mmol of triethylaluminum as Component (B), 0.25 mmol of di-t-buthoxydimethoxysilane as Component (C), and 0.005 mmol of the above solid catalyst component (A) in terms of titanium atom. Polymerization of propylene was carried out at 70° C. for 2 hours under a hydrogen pressure of 0.5 kg/cm$^2$ G and a propylene pressure of 7.0 Kg/cm$^2$ G.

As a result, the yield of polypropylene, the boiling heptane extraction residue (I.I) content and [$\eta$] were 550 kg per 1 g of titanium, 98.1 wt. %, and 1.17 dl/g, respectively.

COMPARATIVE EXAMPLE 1

The same procedures as in Example 1 (2) were repeated except that tetramethoxysilane was used as Component (C) and that the hydrogen pressure was changed to 0.15 kg/cm² G.

As a result, the yield of polypropylene, the boiling heptane extraction residue (I.I) content and [η] were 280 kg per 1 g of titanium, 97.3 wt. %, and 1.30 dl/g, respectively.

EXAMPLE 2

(1) Preparation of Solid Catalyst Component (A):

The solid catalyst Component (A) was prepared in the same manner as in Example 1 (1).

(2) Olefin Polymerization

In a 1-liter stainless steel autoclave, were placed 400 ml of n-heptane, 2.0 mmol of triethylaluminum as Component (B), 0.25 mmol of di-t-butyldimethoxysilane as Component (C), and 0.005 mmol of the above solid catalyst component (A) in terms of titanium atom. Polymerization of propylene was carried out at 70° C. for 2 hours under a hydrogen pressure of 0.5 kg/cm² G and a propylene pressure of 7.0 Kg/cm² G.

As a result, the yield of polypropylene, the boiling heptane extraction residue (I.I) content and [η] were 650 kg per 1 g of titanium, 98.1 wt. %, and 1.17 dl/g, respectively. In accordance with the measurement by GPC, the polypropylene had a molecular weight distribution, Mw/Mn of 8.7.

COMPARATIVE EXAMPLE 2

The same procedures as in Example 2 (2) were repeated except that diphenyldimethoxysilane was used as Component (C).

As a result, the yield of polypropylene, the boiling heptane extraction residue (I.I) content, [η] and Mw/Mn were 540 kg per 1 g of titanium, 98.0 wt. %, 1.40 dl/g and 5.4, respectively.

COMPARATIVE EXAMPLE 3

The same procedures as in Example 2 (2) were repeated except that diisopropyldimethoxysilane was used as Component (C).

As a result, the yield of polypropylene, the boiling heptane extraction residue (I.I) content, [η] and Mw/Mn were 520 kg per 1 g of titanium, 97.8 wt. %, 1.37 dl/g and 5.6, respectively.

EXAMPLE 3

The same procedures as used in Example 1 were repeated except that a magnesium compound prepared according the following method was used.

In a 6-liter glass reactor equipped with a stirrer, in which the air had been thoroughly replaced by nitrogen, were placed about 2430 g of ethanol, 16 g of iodine, and 160 g of metallic magnesium. Reaction was carried out by heating with stirring under refluxing until no hydrogen was evolved any longer to obtain a solid reaction product.

The solid reaction product was analyzed by X-ray diffractometry with Cu-kα line. Three diffraction peaks appeared within the range of 2θ=5–°20°. The ratio of the peak intensity b/c was 0.75, where peaks are designated as a, b, and c starting from the low scattering angle side. In addition, Sphericity (S) was 1.21, and Particle Size Distribution Index (P) was 1.7.

As a result, the yield of polypropylene, the boiling heptane extraction residue (I.I) content and [η] were 560 kg per 1 g of titanium, 98.2 wt. % and 1.22 dl/g, respectively.

EXAMPLE 4

The same procedures as used in Example 2 were repeated except that a magnesium compound prepared according the following method was used.

In a 6-liter glass reactor equipped with a stirrer, in which the air had been thoroughly replaced by nitrogen, were placed about 2430 g of ethanol, 16 g of iodine, and 160 g of metallic magnesium. Reaction was carried out by heating with stirring under refluxing until no hydrogen was evolved any longer to obtain a solid reaction product.

As a result, the yield of polypropylene, the boiling heptane extraction residue (I.I) content, [η] and Mw/Mn were 660 kg per 1 g of titanium, 98.3 wt. %, 1.48 dl/g and 8.3, respectively.

EXAMPLE 5

(1) Preparation of Solid Catalyst Component (A):

The solid catalyst Component (A) was prepared in the same manner as in Example 1 (1).

(2) Olefin Polymerization

In a 1-liter stainless steel autoclave, were placed 400 ml of n-heptane, 2.0 mmol of triethylaluminum as Component (B), 0.25 mmol of t-butylcyclohexyldimethoxysilane as Component (C), and 0.005 mmol of the above solid catalyst component (A) in terms of titanium atom. Polymerization of propylene was carried out for 2 hours under a hydrogen pressure of 0.5 kg/cm² G and a propylene pressure of 7.0 Kg/cm² G.

The results are as shown in Table 1.

COMPARATIVE EXAMPLE 4

The same procedures as in Example 5 were repeated except that in Step (2) diphenyldimethoxysilane was used instead of t-butylcyclohexyldimethoxysilane as Component (C).

COMPARATIVE EXAMPLE 5

The same procedures as in Example 5 were repeated except that in Step (2) diisopropyldimethoxysilane was used instead of t-butylcyclohexyldimethoxysilane as Component (C).

COMPARATIVE EXAMPLE 6

The same procedures as in Example 5 were repeated except that in Step (2) methylcyclohexyldimethoxysilane was used instead of t-butylcyclohexyldimethoxysilane as Component (C).

EXAMPLE 6

The same procedures as in Example 5 were repeated except that in Step (2) isopropylcyclohexyldimethoxysilane was used instead of t-butylcyclohexyldimethoxysilane as Component (C).

EXAMPLE 7

The same procedures as in Example 5 were repeated except that in Step (1) the solid catalyst component (A) was prepared in the same manner as in Example 3.

TABLE 1

|  | Yield of Polypropylene (Kg/gTi) | I.I (wt. %) | [η] (dl/g) | Mw/Mn |
|---|---|---|---|---|
| Example 5 | 570 | 98.3 | 2.48 | 7.2 |
| Example 6 | 550 | 97.9 | 2.25 | 7.4 |
| Example 7 | 600 | 98.4 | 2.38 | 7.8 |
| Comp. Ex. 4 | 540 | 98.0 | 1.40 | 5.4 |
| Comp. Ex. 5 | 520 | 97.8 | 1.37 | 5.6 |
| Comp. Ex. 6 | 520 | 97.2 | 1.42 | 5.4 |

What is claimed is:

1. A process for producing a polyolefin which comprises contacting an olefin with a catalyst comprising:
   (A) a solid catalyst component comprising, as essential components, (a) a magnesium compound, (b) halogenated titanium and (c) an electron donor compound;
   (B) an organoaluminum compound; and
   (C) an organosilicon compound having the general formula:

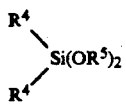
(II)

wherein $R^4$ is a hydrocarbon residue in which a carbon atom adjacent to Si is a tertiary carbon atom; and $R^5$ is a linear or branched hydrocarbon residue.

2. A process for producing a polyolefin which comprises contacting an olefin with a catalyst comprising:
   (A) a solid catalyst component comprising, as essential components, (a) a magnesium compound, (b) halogenated titanium and (c) an electron donor compound;
   (B) an organoaluminum compound; and
   (C) an organosilicon compound having the general formula:

$$R^6R^7Si(OR^8)_2 \qquad (III)$$

wherein $R^6$ is a branched hydrocarbon residue; $R^7$ is a cyclic saturated hydrocarbon residue; and $R8$ is a linear or branched hydrocarbon residue.

3. A process according to claim 1 or 2, wherein the electron donor compound is at least one member selected from monoesters of aromatic dicarboxylic acids and diesters of aromatic dicarboxylic acids.

4. A process according to claim 3, wherein the magnesium compound in the solid catalyst component is a reaction product of metallic magnesium, alcohol and halogen.

5. A process as claimed in claim 1 wherein the magnesium compound in the solid catalyst component is a reaction product of metal magnesium, alcohol and a halogen.

6. A process as claimed in claim 2 wherein the magnesium compound in the solid catalyst component is a reaction product of metal magnesium, alcohol and a halogen.

* * * * *